(12) United States Patent
Lee et al.

(10) Patent No.: US 7,559,671 B2
(45) Date of Patent: Jul. 14, 2009

(54) ILLUMINATION SYSTEM

(75) Inventors: Yu-Tsung Lee, Hsinchu (TW); Ya-Ling Hsu, Hsinchu (TW); Chin-Yuan Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 136 days.

(21) Appl. No.: 11/925,308

(22) Filed: Oct. 26, 2007

(65) Prior Publication Data

US 2008/0247164 A1    Oct. 9, 2008

(30) Foreign Application Priority Data

Apr. 4, 2007    (TW)    ............... 96205489 U

(51) Int. Cl.
*F21V 33/00*    (2006.01)
(52) U.S. Cl. .................. 362/234; 362/235; 362/227; 362/236; 362/241; 362/240; 353/98; 353/99; 359/629
(58) Field of Classification Search .......... 362/234, 362/235, 236, 237, 238, 241, 240, 227, 552, 362/558, 560, 551; 353/98–99; 359/629
See application file for complete search history.

(56) References Cited

U.S. PATENT DOCUMENTS

| | | | |
|---|---|---|---|
| 4,048,486 A * | 9/1977 | Kriege | ........................ 362/554 |
| 6,193,401 B1 * | 2/2001 | Girkin et al. | ................. 362/551 |
| 6,196,699 B1 | 3/2001 | Stanton | |
| 6,648,475 B1 | 11/2003 | Roddy et al. | |
| 6,758,579 B2 | 7/2004 | Ishikawa et al. | |
| 6,857,761 B2 | 2/2005 | Chang | |
| 6,877,882 B1 | 4/2005 | Haven et al. | |
| 6,937,377 B1 | 8/2005 | Brown et al. | |
| 2006/0215404 A1 * | 9/2006 | Chen | ........................... 362/241 |

FOREIGN PATENT DOCUMENTS

| | | |
|---|---|---|
| TW | 564329 | 12/2003 |
| TW | 587195 | 5/2004 |
| TW | 594186 | 6/2004 |

\* cited by examiner

*Primary Examiner*—Jacob Y. Choi
*Assistant Examiner*—Robert May
(74) *Attorney, Agent, or Firm*—J.C. Patents

(57) ABSTRACT

An illumination system including a beam splitter, a first lamp, a second lamp, a first reflector, a second reflector, and a light uniforming element is provided. The first and the second lamp emit a first beam and a second beam to the beam splitter, respectively. A part of the first beam reflected by the beam splitter and a part of the second beam passing through the beam splitter constitute a third beam, and the other part of the first beam passing through the beam splitter and the other part of the second beam reflected by the beam splitter constitute a fourth beam. The first reflector and the second reflector reflect the third beam and the fourth beam, respectively. The light uniforming element is disposed on transmission paths of the reflected third beam and the reflected fourth beam.

20 Claims, 10 Drawing Sheets

ILLUMINATION SYSTEM

CROSS-REFERENCE TO RELATED APPLICATION

This application claims the priority benefit of Taiwan application serial no. 96205489, filed on Apr. 4, 2007. All disclosure of the Taiwan application is incorporated herein by reference.

BACKGROUND OF THE INVENTION

1. Field of the Invention

The present invention relates to an illumination system. More particularly, the present invention relates to a dual lamp illumination system.

2. Description of Related Art

Referring to FIG. 1, a conventional dual lamp illumination system 100 is used for a projection apparatus. The dual lamp illumination system 100 includes a first lamp 110, a second lamp 120, a prism 130, and a light integration rod 140. The first lamp 110 is capable of emitting a first beam 112. The second lamp 120 is capable of emitting a second beam 122. The first lamp 110 and the second lamp 120 are disposed to face each other. The prism 130 is disposed between the first lamp 110 and the second lamp 120, and has a first reflective surface 132 and a second reflective surface 134 to reflect the first beam 112 and the second beam 122 to the light integration rod 140, respectively.

The dual lamp illumination system 100 has two lamps 110 and 120, the first beam 112 and the second beam 122 enter the light integration rod 140 at the same time, and thus the dual lamp illumination system 100 provides a higher level of illumination. Furthermore, chief rays of the first beam 112 and the second beam 122 are obliquely incident to the light integration rod 140 respectively in two symmetric directions, and thus the brightness distribution of illumination output by the dual lamp illumination system 100 is uniform. However, when one of the first lamp 110 and the second lamp 120 is powered off or damaged, only one of the first beam 112 and the second beam 122 is obliquely incident to the light integration rod 140 (only one chief ray is obliquely incident in one direction), and thus the brightness distribution of the illumination output by the dual lamp illumination system 100 is ununiform. Thus, the brightness of image projected by the projection apparatus is distributed ununiformly.

Referring to FIG. 2, a dual lamp illumination system 200 disclosed in U.S. Pat. No. 6,196,699 includes a first lamp 210, a second lamp 220, and a prism 230. The first lamp 210 and the second lamp 220 are disposed to face each other, and respectively emit a first beam 216 and a second beam 226. The prism 230 is disposed between the first lamp 210 and the second lamp 220, and has a first reflective surface 232 and a second reflective surface 234. A part of the first beam 216 emitted by the first lamp 210 is reflected by the first reflective surface 232. The other part of the first beam 216 is projected onto a lamp reflector 224 of the second lamp 220, then reflected by the lamp reflector 224, passes through a lampwick 222 of the second lamp 220, reflected by the lamp reflector 224 and reflected by the second reflective surface 234 sequentially. A part of the second beam 226 emitted by the second lamp 220 is reflected by the second reflective surface 234, and coincides with the first beam 216 reflected by the second reflective surface 234. The other part of the second beam 226 is reflected by a lamp reflector 214 of the first lamp 210, passes through the lampwick 212 of the first lamp 210, reflected by the lamp reflector 214 and reflected by the first reflective surface 232 sequentially, thereby coinciding with the first beam 216 reflected by the first reflective surface 232.

In the dual lamp illumination system 200, as the first beam 216 coincides with the second beam 226 after being reflected by the prism 230, when one of the first lamp 210 and the second lamp 220 is powered off, the brightness of the illumination output by the dual lamp illumination system 200 is reduced to a half, but the brightness distribution is still uniform. However, in the dual lamp illumination system 200, external beams pass through the lampwick 212 and the lampwick 214 concentratively. Specifically, a part of the first beam 216 passes through the lampwick 222 of the second lamp 220 concentratively, and a part of the second beam 226 passes through the lampwick 212 of the first lamp 210 concentratively. Therefore, the lifespan of the lampwick 212 and the lampwick 222 is reduced significantly.

SUMMARY OF THE INVENTION

The present invention is directed to providing an illumination system, which has a longer lifespan and is capable of providing an illumination with uniform brightness distribution both in a single lamp emitting mode and a dual lamp emitting mode.

As embodied and broadly described herein, an embodiment of the present invention provides an illumination system including a beam splitter, a first lamp, a second lamp, a first reflector, a second reflector, and a light uniforming element. The beam splitter is disposed on a first reference plane. The first lamp is disposed on a first side of the first reference plane, and capable of emitting a first beam to the beam splitter. The second lamp is disposed on a second side opposite to the first side of the first reference plane, and capable of emitting a second beam to the beam splitter. A part of the first beam reflected by the beam splitter and a part of the second beam passing through the beam splitter constitute a third beam, and the other part of the first beam passing through the beam splitter and the other part of the second beam reflected by the beam splitter constitute a fourth beam. The first reflector is disposed on the first side of the first reference plane to reflect the third beam. The second reflector is disposed on the second side of the first reference plane to reflect the fourth beam. The light uniforming element is disposed on transmission paths of the reflected the third beam and the reflected fourth beam.

In view of the above, the illumination system of the present invention adopts the beam splitter to split the beams emitted from the first lamp and the second lamp, and the transmission paths of the beams emitted from the two lamps after being split are substantially the same. Therefore, when one of the two lamps is powered off or damaged or the beams emitted from the two lamps have different brightness, the illumination system still provides a uniform distribution of brightness.

Other objectives, features and advantages of the present invention will be further understood from the further technology features disclosed by the embodiments of the present invention wherein there are shown and described preferred embodiments of this invention, simply by way of illustration of modes best suited to carry out the invention.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "over," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "contact with," and variations thereof herein are used broadly and encompass direct and indirect connections, contacts. Accordingly, the drawings and descriptions will be regarded as illustrative in nature and not as restrictive.

Figure 1:
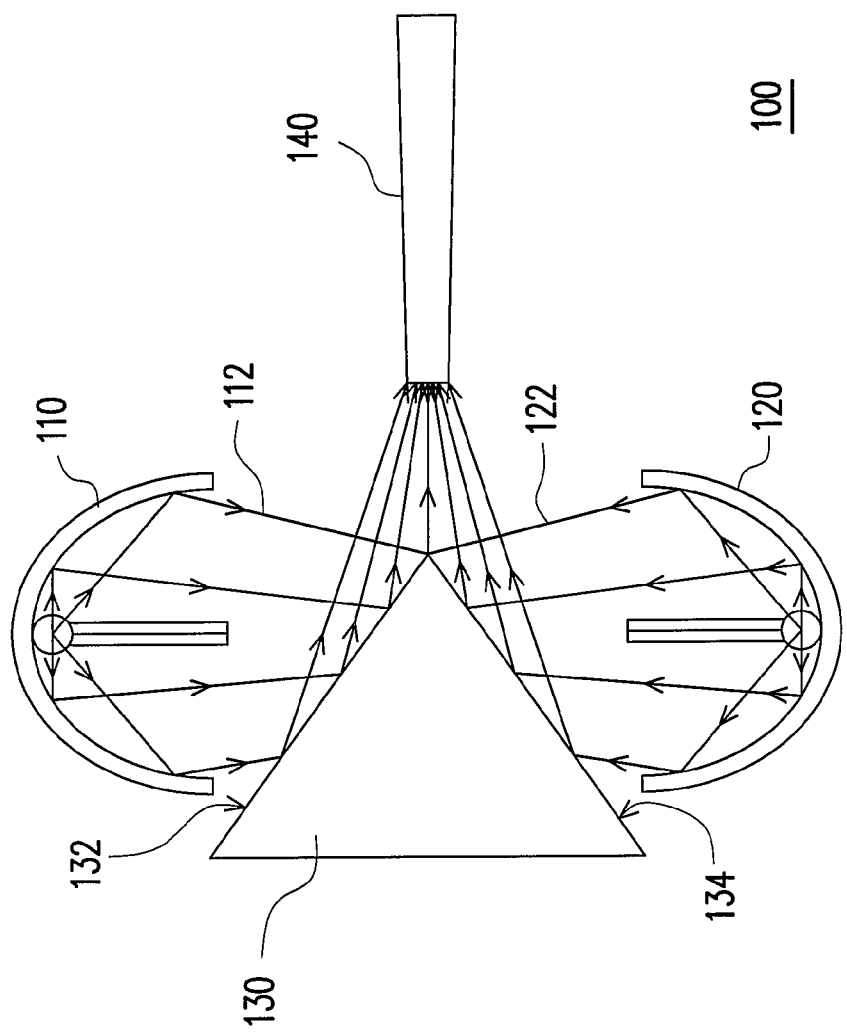
FIG. 1 is a schematic view of a conventional dual lamp illumination system.
Figure 2:
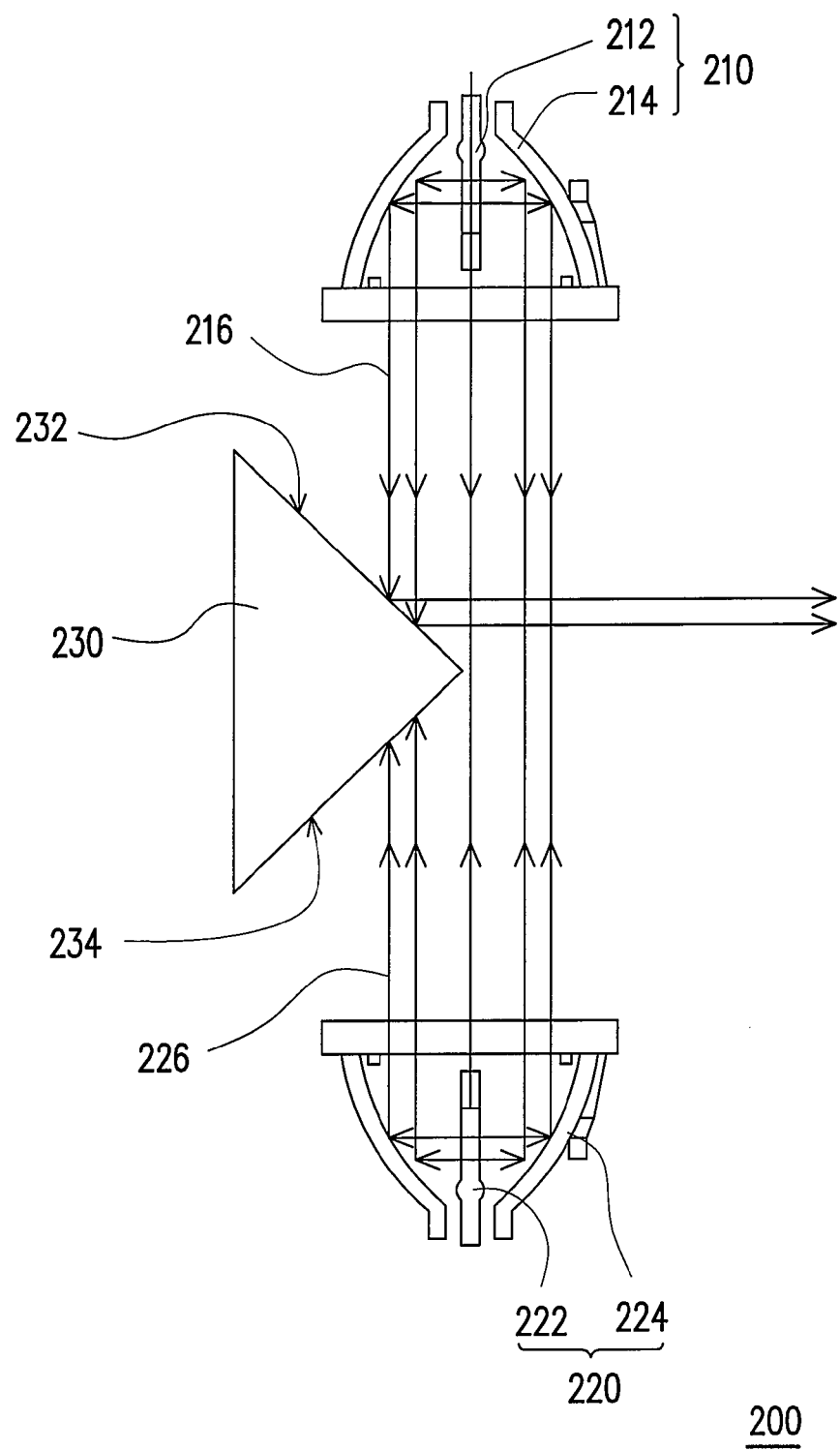
FIG. 2 is a schematic view of another conventional dual lamp illumination system.
Figure 3A:
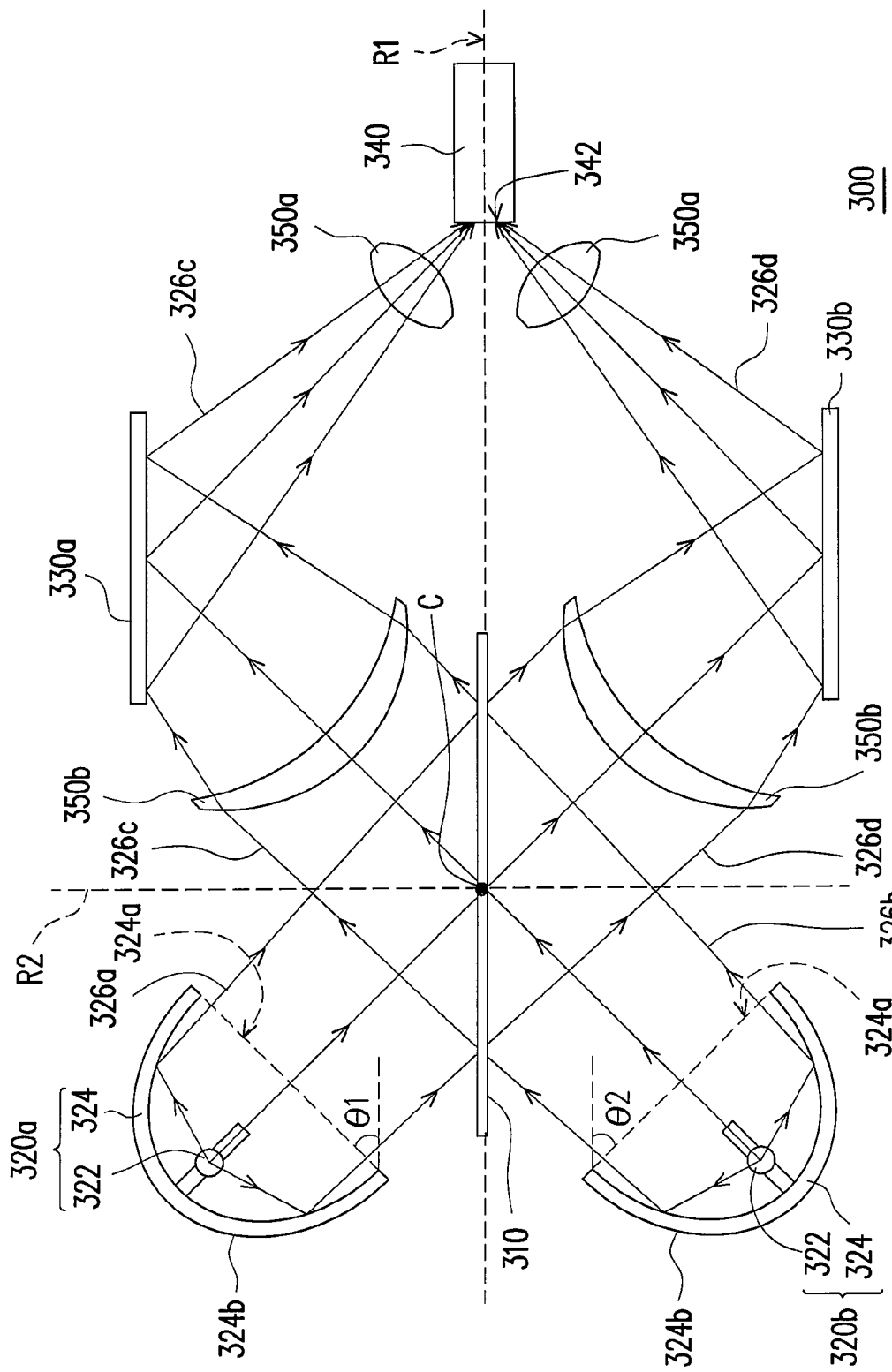
FIG. 3A is a schematic view of an illumination system according to an embodiment of the present invention.

Referring to FIG. 3A, an illumination system 300 in an embodiment of the present invention is suitable for applying in a projection apparatus (not shown). The illumination system 300 includes a beam splitter 310, a first lamp 320a, a second lamp 320b, a first reflector 330a, a second reflector 330b, and a light uniforming element 340. The beam splitter 310 is disposed on a first reference plane R1. The first lamp 320a is disposed on a first side of the first reference plane R1, and capable of emitting a first beam 326a to the beam splitter 310. The second lamp 320b is disposed on a second side opposite to the first side of the first reference plane R1, and capable of emitting a second beam 326b to the beam splitter 310. A part of the first beam 326a reflected by the beam splitter 310 and a part of the second beam 326b passing through the beam splitter 310 constitute a third beam 326c, and the other part of the first beam 326a passing through the beam splitter 310 and the other part of the second beam 326b reflected by the beam splitter 310 constitute a fourth beam 326d. The first reflector 330a is disposed on the first side of the first reference plane R1 to reflect the third beam 326c. The second reflector 330b is disposed on the second side of the first reference plane R1 to reflect the fourth beam 326d. The light uniforming element 340 is disposed on the transmission paths of the third beam 326c reflected by the first reflector 330a and the fourth beam 326d reflected by the second reflector 330b.

Figure 3B:
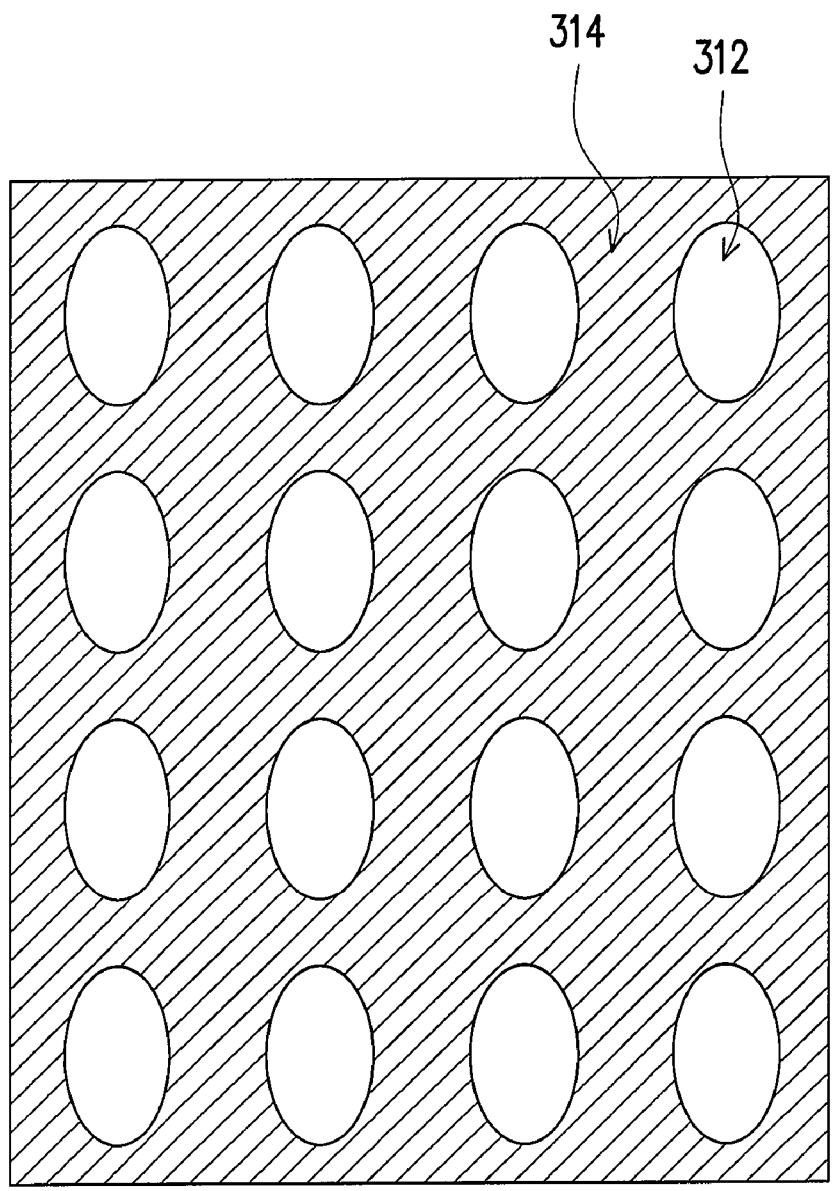
FIG. 3B is a schematic view of the beam splitter in FIG. 3A.

Referring to FIG. 3A and FIG. 3B, in this embodiment, the beam splitter 310 has a light transmissive region 312 and a light reflective region 314. An area of the light transmissive region 312 and an area of the light reflective region 314 are substantially the same, such that the proportion of the light passing through the light transmissive region 312 (e.g., the first beam 326a and the second beam 326b) and the proportion of the light reflected by the light reflective region 314 are substantially the same. In other embodiments, the beam splitter 310 also has a transflective film to replace the light transmissive region 312 and the light reflective region 314 for making the proportions of the passing light and the reflected light substantially the same.

The first lamp 320a and the second lamp 320b each include a lamp reflector 324 and a lampwick 322. The lamp reflector 324 has a light emitting cross section 324a and a bottom 324b opposite to the light emitting cross section 324a. The lampwick 322 is disposed at a bottom 324b of the lamp reflector 324. In this embodiment, the lamp reflector 324 is, for example, a parabolic lamp reflector. However, in other embodiments, the lamp reflector 324 is an oval lamp reflector or a lamp reflector of other suitable shapes.

In this embodiment, the first lamp 320a and the second lamp 320b are disposed symmetrically about the first reference plane R1, and the first reflector 330a and the second reflector 330b are disposed symmetrically about the first reference plane R1, such that the third beam 326c and the fourth beam 326d are symmetric with respect to the first reference plane R1.

Moreover, a first inclined angle $\theta1$ is formed between the light emitting cross section 324a of the first lamp 320a and the first reference plane R1, and a second inclined angle $\theta2$ is formed between the light emitting cross section 324a of the second lamp 320b and the first reference plane R1. The first inclined angle $\theta1$ and the second inclined angle $\theta2$ are substantially the same, and the first inclined angle $\theta1$ and the second inclined angle $\theta2$ are all greater than 0 degrees and smaller than 90 degrees, i.e., $0°<\theta1<90°$, $0°<\theta2<90°$. In this embodiment, the first inclined angle $\theta1$ is about 45 degrees, and the second inclined angle $\theta2$ is about 45 degrees. Furthermore, a projection range of the first beam 326a and the second beam 326b on beam splitter 310 has a central point C located on the first reference plane R1 and a second reference plane R2 perpendicular to the first reference plane R1. The first lamp 320a and the second lamp 320b are located on the same side of the second reference plane R2. In this manner, the first beam 326a emitted by the first lamp 320a does not pass through the lampwick 322 of the second lamp 320b concentratively to shorten the lifespan of the lampwick 322 of the second lamp 320b. Similarly, the second beam 326b does not shorten the lifespan of the lampwick 322 of the first lamp 320a. Moreover, the first lamp 320a and the second lamp 320b are prevented from interfering with each other by adopting the above arrangement.

In this embodiment, the light uniforming element 340 is, for example, a light integration rod disposed on the first reference plane R1. The light uniforming element 340 is capable of outputting the third beam 326c and the fourth beam 326d to a light valve (not shown) of the projection apparatus. The light valve is, for example, a digital micro-mirror device (DMD), a liquid crystal on silicon panel (LCOS panel), a transmissive liquid crystal display panel or other light valves.

In this embodiment, the first reflector 330a and the second reflector 330b are, for example, reflective mirrors or other devices with reflective function, and the first reflector 330a and the second reflector 330b are parallel to the first reference plane R1.

Moreover, the illumination system 300 further includes a plurality of first lenses 350a disposed on the transmission paths of the third beam 326c and the fourth beam 326d respectively, and located between the first reflector 330a and the light uniforming element 340 and between the second reflector 330b and the light uniforming element 340 respectively, so as to focus the third beam 326c and the fourth beam 326d to the light uniforming element 340. Furthermore, the illumination system 300 further includes a plurality of second lenses 350b disposed on the transmission paths of the third beam 326c and the fourth beam 326d respectively, and located between the beam splitter 310 and the first reflector 330a and between the beam splitter 310 and the second reflector 330b respectively, so as to respectively focus the third beam 236c and the fourth beam 326d to the first reflector 330a and the second reflector 330b.

Figure 4C:
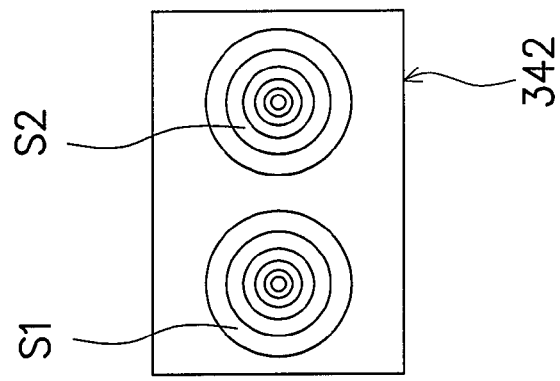
FIG. 4C is an isobrightness diagram of light spots at the entry end of the light uniforming element of the illumination system in FIG. 3A in the mode that only the second lamp is lightened.
Figure 4B:
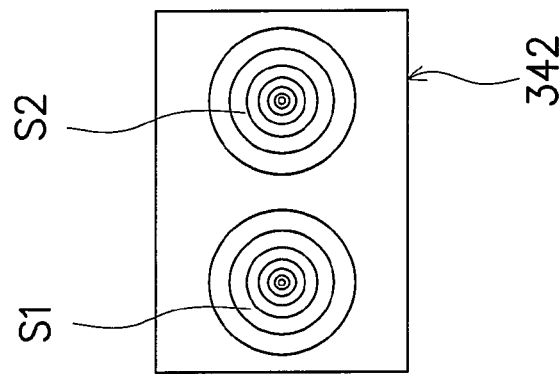
FIG. 4B is an isobrightness diagram of light spots at the entry end of the light uniforming element of the illumination system in FIG. 3A in the mode that only the first lamp is lightened.
Figure 4A:
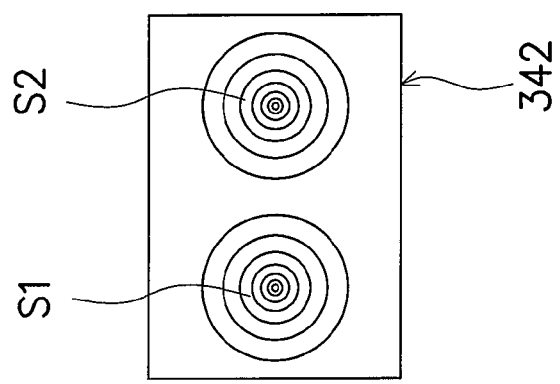
FIG. 4A is an isobrightness diagram of light spots at an entry end of the light uniforming element of the illumination system in FIG. 3A in the mode that the first lamp and second lamp are lightened.

FIG. 4A is an isobrightness diagram of light spots at an entry end of the light uniforming element of the illumination system in FIG. 3A in the mode that the first lamp and second lamp are lightened. FIG. 4B is an isobrightness diagram of light spots at the entry end of the light uniforming element of the illumination system in FIG. 3A in the mode that only the first lamp is lightened. FIG. 4C is an isobrightness diagram of light spots at the entry end of the light uniforming element of the illumination system in FIG. 3A in the mode that only the second lamp is lightened. In FIGS. 4A to 4C, the brightness on a circle curve is constant, and the brightnesses on these circle curves decrease from the circle curve adjacent to the center to that adjacent to the periphery. The circle curves representing a light spot S1 and the brightnesses thereof are substantially symmetrical to the circle curves representing a light spot S2 and the brightnesses thereof. Referring to FIG. 3A and FIGS. 4A to 4C, in this embodiment, the beam splitter 310 splits the first beam 326a into two beams symmetric to each other, and splits the second beam 326b into two beams symmetric to each other. The first beam 326a and the second beam 326b after being split constitute the third beam 326c and the fourth beam 326d symmetric to each other. Therefore, no matter the illumination system 300 is in any mode from the above three modes, two symmetric light spots S1 and S2 are formed at an entry end 342 of the light uniforming element 340. In this manner, no matter one of the first lamp 320a and second lamp 320b is powered off or damaged, or the two lamps 320a and 320b are lightened, the illumination system 300 outputs an illumination with uniform distribution of brightness, such that the brightness of image provided by the projection apparatus is distributed uniformly.

Furthermore, when the brightness of the first lamp 320a is not consistent with the brightness of the second lamp 320b, the architecture of this embodiment also makes the two light spots S1 and S2 formed at the entry end 342 of the light uniforming element 340 to be symmetric, such that the illumination system 300 provides an illumination with uniform distribution of brightness.

TABLE 1

| Position | Two lamps are lightened | Only the first lamp is lightened | Only the second lamp is lightened | Difference |
|---|---|---|---|---|
| O.1 | 91.2% | 96.4% | 90.6% | 6.3% |
| O.2 | 86.7% | 85.1% | 91.7% | 7.5% |
| O.3 | 91.9% | 95.3% | 94.6% | 3.7% |
| O.4 | 92.2% | 90.1% | 94.4% | 4.6% |
| I.11 | 100.0% | 97.4% | 98.1% | 2.6% |
| I.12 | 95.5% | 97.2% | 90.5% | 7.1% |
| I.13 | 90.6% | 94.7% | 90.2% | 4.8% |
| I.21 | 97.6% | 100.0% | 99.0% | 2.4% |
| I.22 | 92.8% | 95.2% | 100.0% | 7.5% |
| I.23 | 90.7% | 96.5% | 91.6% | 6.2% |
| I.31 | 94.9% | 95.5% | 98.9% | 4.1% |
| I.32 | 91.5% | 90.6% | 92.2% | 1.7% |
| I.33 | 95.0% | 98.4% | 99.1% | 4.1% |
| Difference | 14.3% | 15.7% | 10.3% | |
| ANSI | 91.9% | 88.5% | 94.8% | |

Figure 5A:
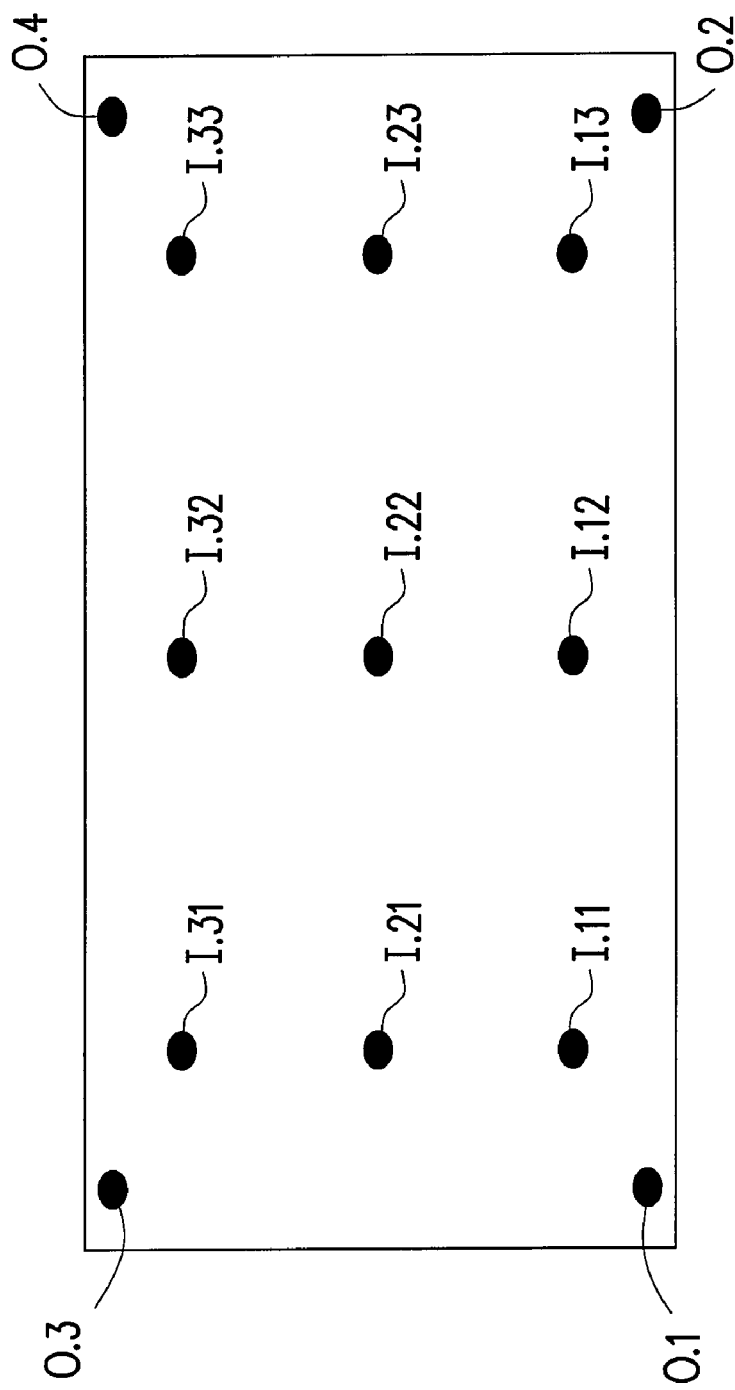
FIG. 5A shows marks of positions of image projected by the projection apparatus of the illumination system in FIG. 3A.
Figure 5B:
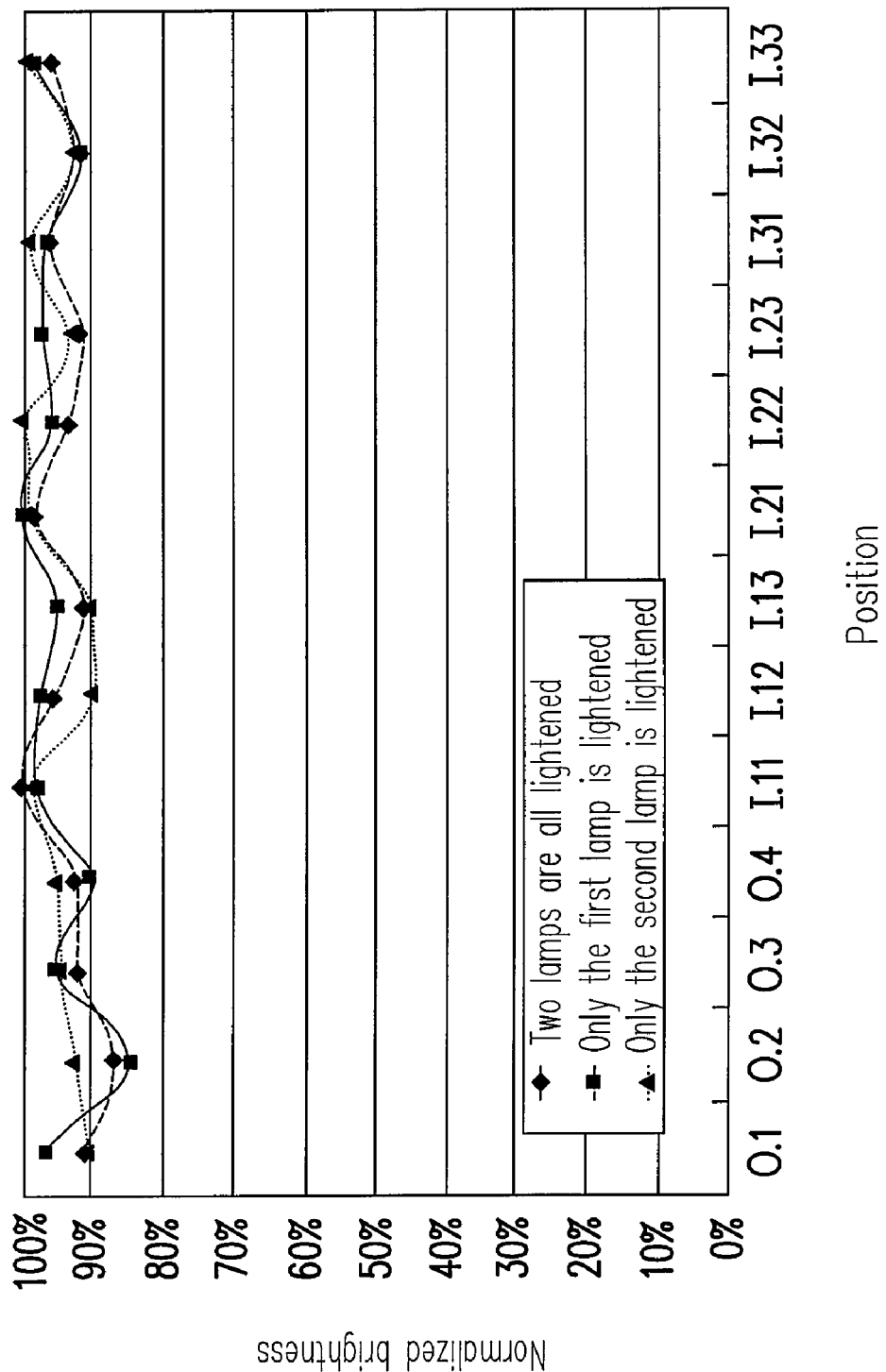
FIG. 5B is a curve diagram of data in Table 1.

Referring to FIG. 5A, FIG. 5B, and Table 1, the differences in the last column of the Table 1 is differences between a maximal normalized brightness and a minimal normalized brightness at the same position in three modes. The differences in the last second row of Table 1 are differences between a maximal normalized brightness and a minimal normalized brightness at 13 positions marked in FIG. 5A in the same mode. The ANSI values in the last row of Table 1 are international standardized values of uniformity of images. It can be known from Table 1 that in this embodiment, the ANSI values of the images projected by the projection apparatus are at least 88%, and thus it is verified that the brightness distribution of the images is always uniform no matter the illumination system 300 (referring to FIG. 3A) is any one of the above three modes.

Referring to FIG. 3A again, in this embodiment, the first lamp 320a and the second lamp 320b are further disposed symmetrically with respect to the beam splitter 310 accurately, such that the first beam 326a reflected by the beam splitter 310 coincides with the second beam 326b passing through the beam splitter 310 to constitute the third beam 326c, and the first beam 326a passing through the beam splitter 310 coincides with the second beam 326b reflected by the beam splitter 310 to constitute the fourth beam 326d. In this manner, the illumination provided by the illumination system 300 and the uniformity of the brightness distribution of the images projected by the projection apparatus are further improved, and the difference of the uniformity of brightness distribution of the images in three different modes is further reduced.

Figure 6:
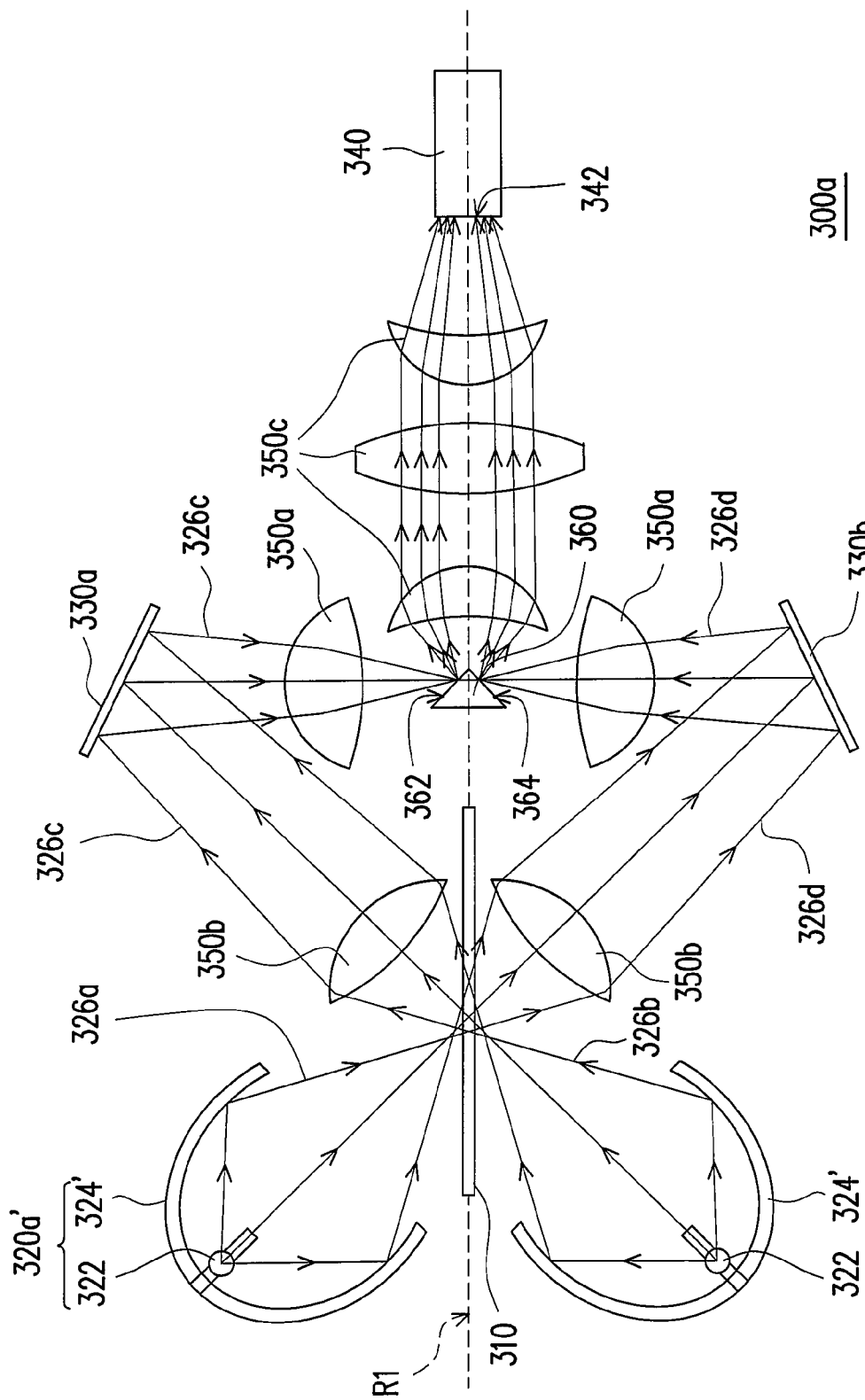
FIG. 6 is a schematic view of an illumination system according to another embodiment of the present invention.

Referring to FIG. 6, an illumination system 300a according to another embodiment of the present invention is similar to the above illumination system 300 (referring to FIG. 3A), except that the illumination system 300a further includes a reflector 360 disposed between the beam splitter 310 and the light uniforming element 340, so as to reflect the third beam 326c from the first reflector 330a and the fourth beam 326d from the second reflector 330b to the light uniforming element 340. In this embodiment, the reflector 360 is, for example, a prism having two reflective surfaces 362, 364. The reflective surfaces 362, 364 respectively reflect the third beam 326c and the fourth beam 326d to the light uniforming element 340. Furthermore, the illumination system 300a further includes at least one third lens 350c disposed on the transmission paths of the third beam 326c and the fourth beam 326d, and the third lens 350c is located between the reflector 360 and the light uniforming element 340, so as to converge the third beam 326c and the fourth beam 326d to the light uniforming element 340. It should be noted that lamp reflectors 324' of a first lamp 320a' and a second lamp 320b' in FIG. 6 are oval lamp reflectors. However, the present invention is not limited herein.

Figure 7:
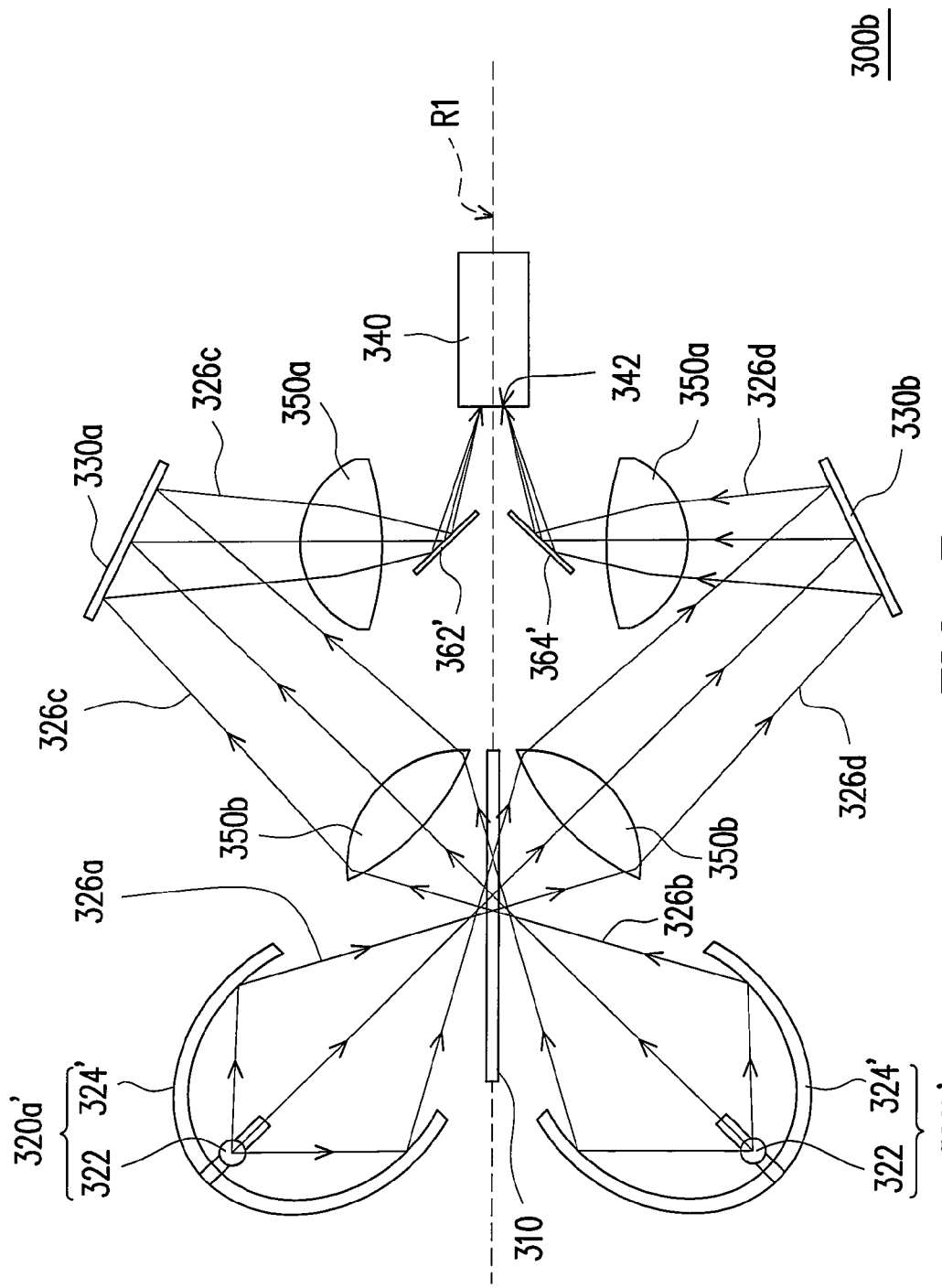
FIG. 7 is a schematic view of an illumination system according to yet another embodiment of the present invention.

Referring to FIG. 7, an illumination system 300b according to yet another embodiment of the present invention is similar to the above illumination system 300a (referring to FIG. 6), except that in the illumination system 300b, the reflector 360' includes two reflective mirrors 362', 364'. The reflective mirrors 362', 364' respectively reflect the third beam 326c and the fourth beam 326d to the light uniforming element 340.

Figure 8:
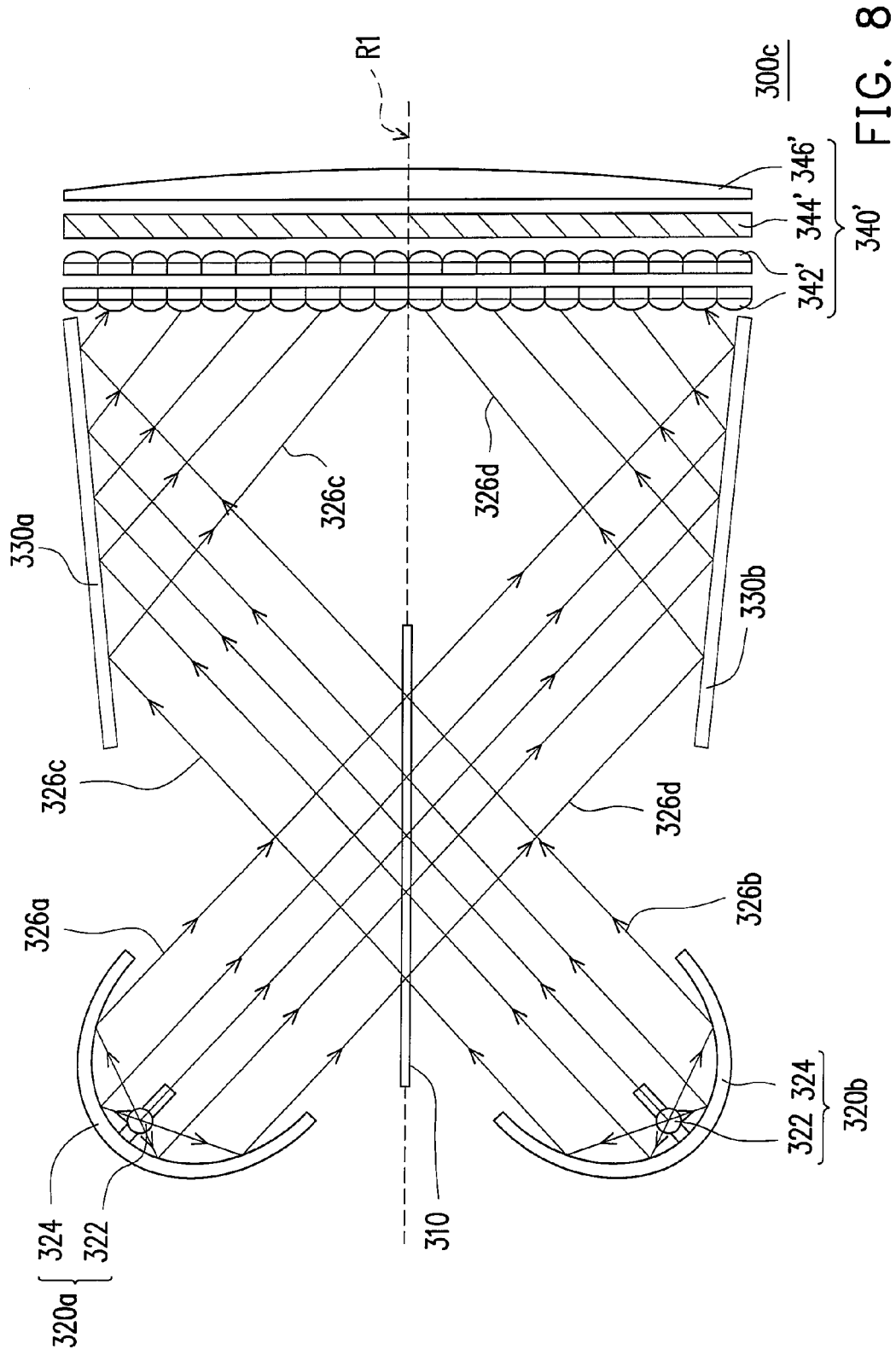
FIG. 8 is a schematic view of an illumination system according to still another embodiment of the present invention.

Referring to FIG. 8, an illumination system 300c according to still another embodiment of the present invention is similar to the above illumination system 300 (referring to FIG. 3A), except that in the illumination system 300c, the light uniforming element 340' includes a lens array 342'. Moreover, the light uniforming element 340' further includes a fourth lens 346' and a polarization conversion system (PCS) 344'. The lens array 342' is located between the beam splitter 310 and the fourth lens 346', and the PCS 344' is disposed between the lens array 342' and the fourth lens 346'.

In view of the above, in the illumination system of the present invention, the beam splitter splits the first beam into two beams symmetric to each other, and splits the second beam into two beams symmetric to each other. The first beam and the second beam after being split constitute the third beam and fourth beam symmetric to each other. Therefore, no matter the illumination system is in the mode that the first lamp and the second lamp are lightened, or in the mode only one of the lamps is lightened, two symmetric light spots are formed at the entry end of the light uniforming element. In this manner, no matter one of the first lamp and the second lamp is powered off or damaged, or the two lamps are lightened, the illumination system outputs an illumination with uniform brightness distribution, such that the brightness of the images provided by the projection apparatus is distributed uniformly.

Further, when the brightness of the first lamp is not consistent to the brightness of the second lamp, the architecture of the embodiments of the invention makes the two light spots formed at the entry end of the light uniforming element to be symmetric, such that the illumination system provides an illumination with uniform brightness distribution.

Moreover, in the present invention, the light emitting cross sections of the first lamp and the second lamp are inclined with respect to the beam splitter. Thus, the first beam emitted by the first lamp does not pass through the lampwick of the second lamp concentratively, and the second beam emitted by the second lamp does not pass through the lampwick of the first lamp. In this manner, the lampwicks of the first lamp and the second lamp have longer lifespan.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
    a beam splitter, disposed on a first reference plane;
    a first lamp, disposed on a first side of the first reference plane, and capable of emitting a first beam to the beam splitter;
    a second lamp, disposed on a second side opposite to the first side of the first reference plane, and capable of emitting a second beam to the beam splitter, wherein a part of the first beam reflected by the beam splitter and a part of the second beam passing through the beam splitter constitute a third beam, and the other part of the first beam passing through the beam splitter and the other part of the second beam reflected by the beam splitter constitute a fourth beam;
    a first reflector, disposed on the first side of the first reference plane for reflecting the third beam;
    a second reflector, disposed on the second side of the first reference plane for reflecting the fourth beam; and
    a light uniforming element, disposed on transmission paths of the third beam reflected by the first reflector, and the fourth beam reflected by the second reflector.

2. The illumination system as claimed in claim 1, wherein the beam splitter comprises a transflective film.

3. The illumination system as claimed in claim 1, wherein the beam splitter comprises a light transmissive region and a light reflective region.

4. The illumination system as claimed in claim 3, wherein an area of the light transmissive region and an area of the light reflective region are substantially the same.

5. The illumination system as claimed in claim 1, wherein the part of the first beam reflected by the beam splitter coincides with the part of the second beam passing through the beam splitter to constitute the third beam, and the part of the first beam passing through the beam splitter coincides with the part of the second beam reflected by the beam splitter to constitute the fourth beam.

6. The illumination system as claimed in claim 1, wherein the first lamp and the second lamp are disposed symmetrically about the first reference plane, and the first reflector and the second reflector are disposed symmetrically about the first reference plane.

7. The illumination system as claimed in claim 1, wherein the first lamp comprises a first light emitting cross section and the second lamp comprises a second light emitting cross section, a first inclined angle is formed between the first light emitting cross section and the first reference plane, a second inclined angle is formed between the second light emitting cross section and the first reference plane, the first inclined angle and the second inclined angle are substantially the same, and the first inclined angle and the second inclined angle are greater than 0 degrees and smaller than 90 degrees.

8. The illumination system as claimed in claim 7, wherein the first inclined angle and the second inclined angle are about 45 degrees.

9. The illumination system as claimed in claim 1, wherein a projection range of the first beam and the second beam on the beam splitter comprises a central point located on a second reference plane perpendicular to the first reference plane, and the first lamp and the second lamp are located on a same side of the second reference plane.

10. The illumination system as claimed in claim 1, wherein the light uniforming element comprises a light integration rod disposed on the first reference plane.

11. The illumination system as claimed in claim 1, further comprising a plurality of first lenses disposed on the transmission paths of the third beam and the fourth beam respectively, wherein the first lenses are located between the first reflector and the light uniforming element and between the second reflector and the light uniforming element respectively.

12. The illumination system as claimed in claim 1, further comprising a plurality of second lenses disposed on the transmission paths of the third beam and the fourth beam respectively, wherein the second lenses are located between the beam splitter and the first reflector and between the beam splitter and the second reflector respectively.

13. The illumination system as claimed in claim 1, further comprising a reflector disposed between the beam splitter and the light uniforming element to reflect the third beam from the first reflector and the fourth beam from the second reflector to the light uniforming element.

14. The illumination system as claimed in claim 13, wherein the reflector comprises a prism having two reflective surfaces, and the reflective surfaces reflect the third beam and the fourth beam to the light uniforming element respectively.

15. The illumination system as claimed in claim 13, wherein the reflector comprises two reflective mirrors, and the reflective mirrors reflect the third beam and the fourth beam to the light uniforming element respectively.

16. The illumination system as claimed in claim 13, further comprising at least one third lens disposed on the transmission paths of the third beam and the fourth beam, wherein the third lens is located between the reflector and the light uniforming element.

17. The illumination system as claimed in claim 1, wherein the light uniforming element comprises a lens array.

18. The illumination system as claimed in claim 17, wherein the light uniforming element further comprises:
a fourth lens, wherein the lens array is located between the beam splitter and the fourth lens; and
a polarization conversion system, disposed between the lens array and the fourth lens.

19. The illumination system as claimed in claim 1, wherein the first lamp and the second lamp each comprise:
a lamp reflector, having a light emitting cross section and a bottom opposite to the light emitting cross section; and
a lampwick, disposed at the bottom.

20. The illumination system as claimed in claim 19, wherein the lamp reflector comprises an oval lamp reflector or a parabolic lamp reflector.

* * * * *